United States Patent
Tanaka

(10) Patent No.: US 7,788,221 B2
(45) Date of Patent: Aug. 31, 2010

(54) ELECTRONIC FILE CONVERSION PROGRAM, ELECTRONIC FILE CONVERSION APPARATUS, ELECTRONIC FILE CONVERSION SYSTEM, COMPUTER DATA SIGNAL, AND ELECTRONIC CONVERSION METHOD

(75) Inventor: Yasuo Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 205 days.

(21) Appl. No.: 11/633,465

(22) Filed: Dec. 5, 2006

(65) Prior Publication Data
US 2008/0030759 A1 Feb. 7, 2008

(30) Foreign Application Priority Data
Jul. 31, 2006 (JP) ............................. 2006-207622

(51) Int. Cl.
G06F 17/30 (2006.01)
(52) U.S. Cl. .................. 707/610; 707/638
(58) Field of Classification Search ............. 707/610, 707/638
See application file for complete search history.

(56) References Cited

U.S. PATENT DOCUMENTS

| | | | |
|---|---|---|---|
| 4,432,057 A * | 2/1984 | Daniell et al. ............... | 1/1 |
| 5,600,834 A * | 2/1997 | Howard ...................... | 1/1 |
| 5,832,510 A * | 11/1998 | Ito et al. ..................... | 1/1 |
| 5,960,446 A * | 9/1999 | Schmuck et al. ............. | 1/1 |
| 6,014,669 A * | 1/2000 | Slaughter et al. ............ | 1/1 |
| 6,157,706 A * | 12/2000 | Rachelson ............. | 379/100.08 |
| 6,317,754 B1 * | 11/2001 | Peng ........................ | 1/1 |
| 6,424,426 B1 * | 7/2002 | Henry ................... | 358/1.15 |
| 6,442,591 B1 * | 8/2002 | Haynes et al. ............. | 709/206 |
| 6,516,312 B1 * | 2/2003 | Kraft et al. ................ | 1/1 |
| 6,609,128 B1 * | 8/2003 | Underwood ................ | 1/1 |
| 6,732,122 B2 * | 5/2004 | Zoltan ...................... | 1/1 |
| 6,934,725 B1 * | 8/2005 | Dings ....................... | 1/1 |
| 6,978,282 B1 * | 12/2005 | Dings et al. ............... | 1/1 |
| 2001/0050690 A1 * | 12/2001 | Giles et al. ................ | 345/636 |
| 2004/0083434 A1 * | 4/2004 | Fitch ....................... | 715/541 |
| 2007/0013943 A1 * | 1/2007 | Sawayanagi et al. ....... | 358/1.15 |
| 2007/0033410 A1 * | 2/2007 | Eagle et al. ................ | 713/176 |

FOREIGN PATENT DOCUMENTS

JP 2001318997 A 11/2001

* cited by examiner

Primary Examiner—Don Wong
Assistant Examiner—Kim T Nguyen
(74) Attorney, Agent, or Firm—Sughrue Mion, PLLC

(57) ABSTRACT

An electronic file conversion program that causes a computer to perform a function including: converting a description format of an electronic file stored in a memory; detecting, from the memory, an electronic file of which description format is to be converted; and controlling to store in the memory, the electronic file of which description format is converted.

12 Claims, 12 Drawing Sheets

ELECTRONIC FILE CONVERSION PROGRAM, ELECTRONIC FILE CONVERSION APPARATUS, ELECTRONIC FILE CONVERSION SYSTEM, COMPUTER DATA SIGNAL, AND ELECTRONIC CONVERSION METHOD

BACKGROUND

1. Technical Field

This invention generally relates to an electronic file conversion program, an electronic file conversion apparatus, an electronic file conversion system, a computer data signal, and an electronic file conversion method.

2. Related Art

Multifunctional and sophisticated computer systems have introduced the complexity of hardware configuration of the computer system, configuration of operating system (hereinafter, simply referred to as OS) for managing and controlling the hardware and the like, and the configuration of software such as applications for executing processes by use of the processes provided by the OS (hereinafter, simply referred to as software configuration). This has changed information usable by the computer systems.

The software configuration and the like are changed on countless occasions. Therefore, as the number of content formats employed in the system in the past is increased, in particular, when any of the content formats are no longer used in the system, it becomes difficult to continuously use electronic files thereof.

SUMMARY

An aspect of the present invention provides an electronic file conversion program that causes a computer to perform a function including: converting a description format of an electronic file stored in a memory; detecting, from the memory, an electronic file of which description format is to be converted; and controlling to store in the memory, the electronic file of which description format is converted.

BRIEF DESCRIPTION OF THE DRAWINGS

Embodiments of the present invention will be described in detail based on the following figures, wherein.

DETAILED DESCRIPTION

A description will now be given, with reference to the accompanying drawings, of exemplary embodiments of the present invention.

First Exemplary Embodiment

Figure 1:
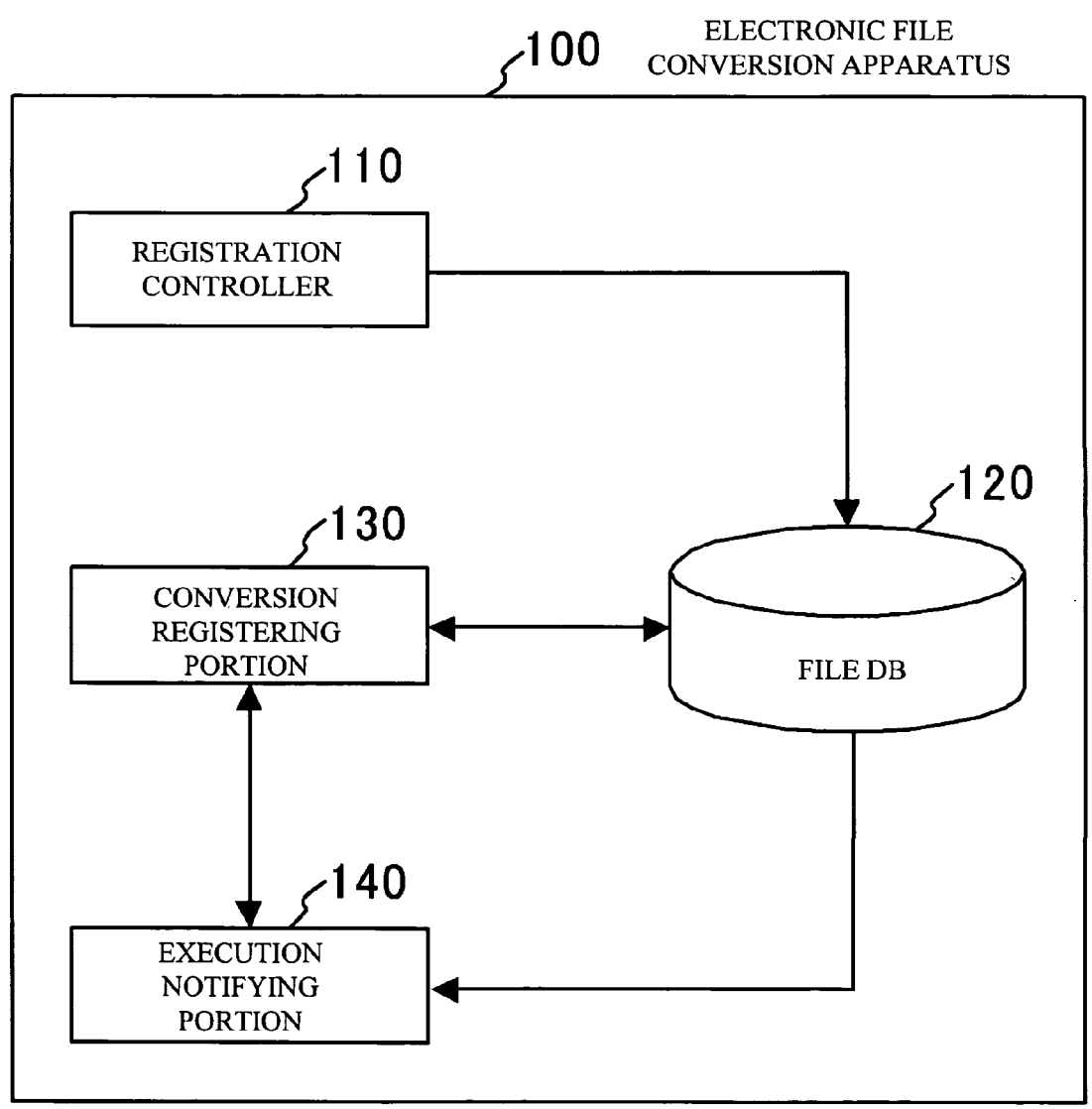
FIG. 1 is a functional block diagram showing an exemplary embodiment of an electronic file conversion apparatus in accordance with an aspect of the invention.

FIG. 1 shows a structural diagram showing an exemplary embodiment of an electronic file conversion apparatus 100 in accordance with an aspect of the invention. The electronic file conversion apparatus 100 is composed of: a registration controller 110; a file database 120; a conversion registering portion 130; and an execution notifying portion 140.

The registration controller 110, the file database 120, the conversion registering portion 130, and the execution notifying portion 140 may be performed by software control executed by the electronic file conversion apparatus 100.

Figure 2:
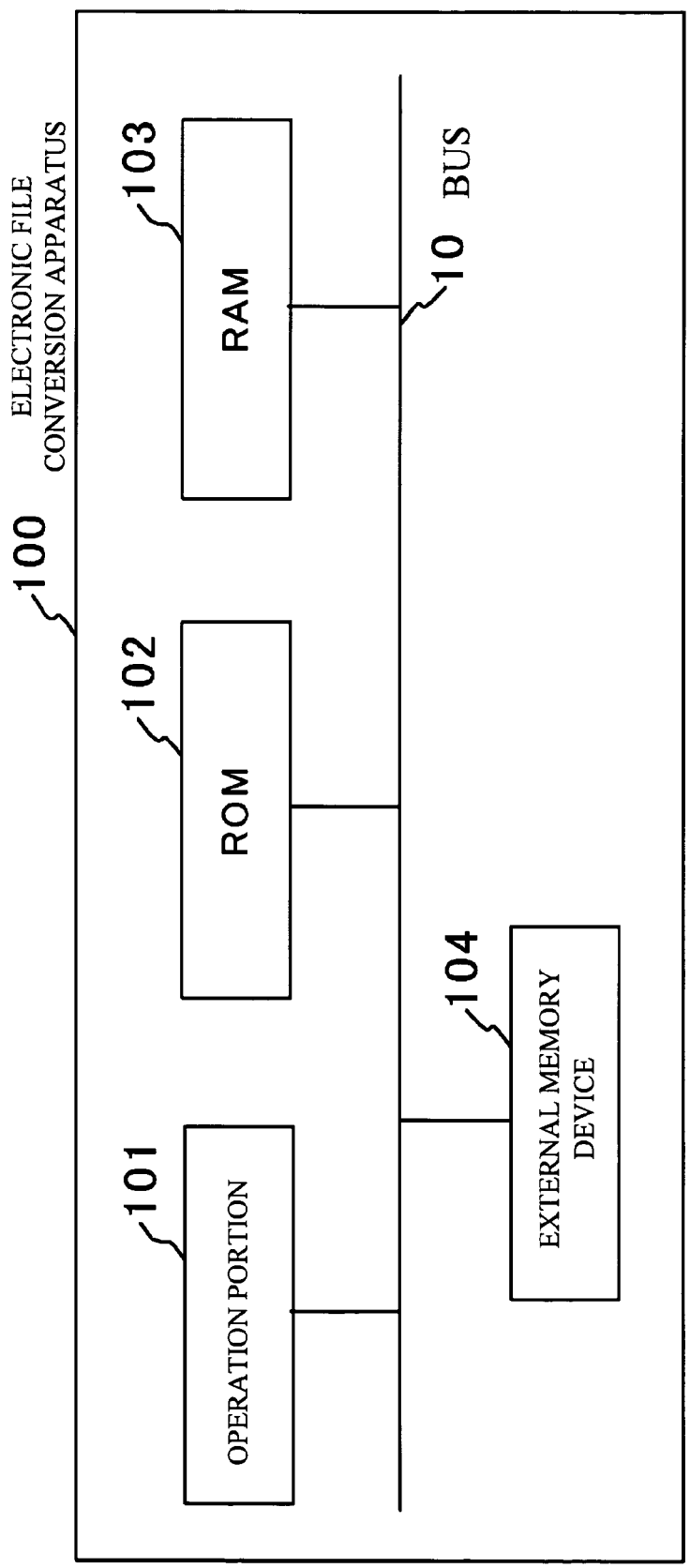
FIG. 2 is a hardware configuration showing the exemplary embodiment of the electronic file conversion apparatus in accordance with an aspect of the invention.

Referring to FIG. 2, a description will be given of a hardware configuration of the electronic file conversion apparatus 100 that executes the software control. FIG. 2 is a hardware configuration diagram showing an example of the hardware configuration of the electronic file conversion apparatus 100 that performs the software control.

The electronic file conversion apparatus 100 is composed of: for example, an operation portion 101 such as a Central Processing Unit (CPU); a Read Only Memory (ROM) 102, which is dedicated for reading, such as an Erasable Programmable Read Only Memory (EPROM) and an Electrically Erasable Programmable Read Only Memory (EEPROM); a Random Access Memory (RAM) 103 composed of a volatile memory, such as a Dynamic RAM (DRAM) and Static RAM (SRAM) or a non-volatile memory such as an Non Volatile RAM (NVRAM); and an external memory device 104 such as a hard disk. The operation portion 101, the ROM 102, the RAM 103, and the external memory device 104 are connected to each other through a bus 105.

In the software control, functions of the respective components are realized in such a manner that a program stored in at least one of the ROM 102, the RAM 103, and the external memory device 104 is read by the operation portion 101 and the operation portion 101 performs an operation according to the program read.

Here, referring back to FIG. 1, the electronic file conversion apparatus 100 will be described. The registration controller 110 is connected to the file database 120. The registration controller 110, not shown, is connected to an input portion composed of: for example, a keyboard; a button; a touch panel or the like, the external memory device 104 such as a hard disk, and a communication portion composed of a network adaptor.

The registration controller 110 executes a registration controlling process to control the memory portion to store an electronic file. Here, the memory portion, not shown, is composed of the external memory device 104 such as a hard disk or the like.

Figure 3:
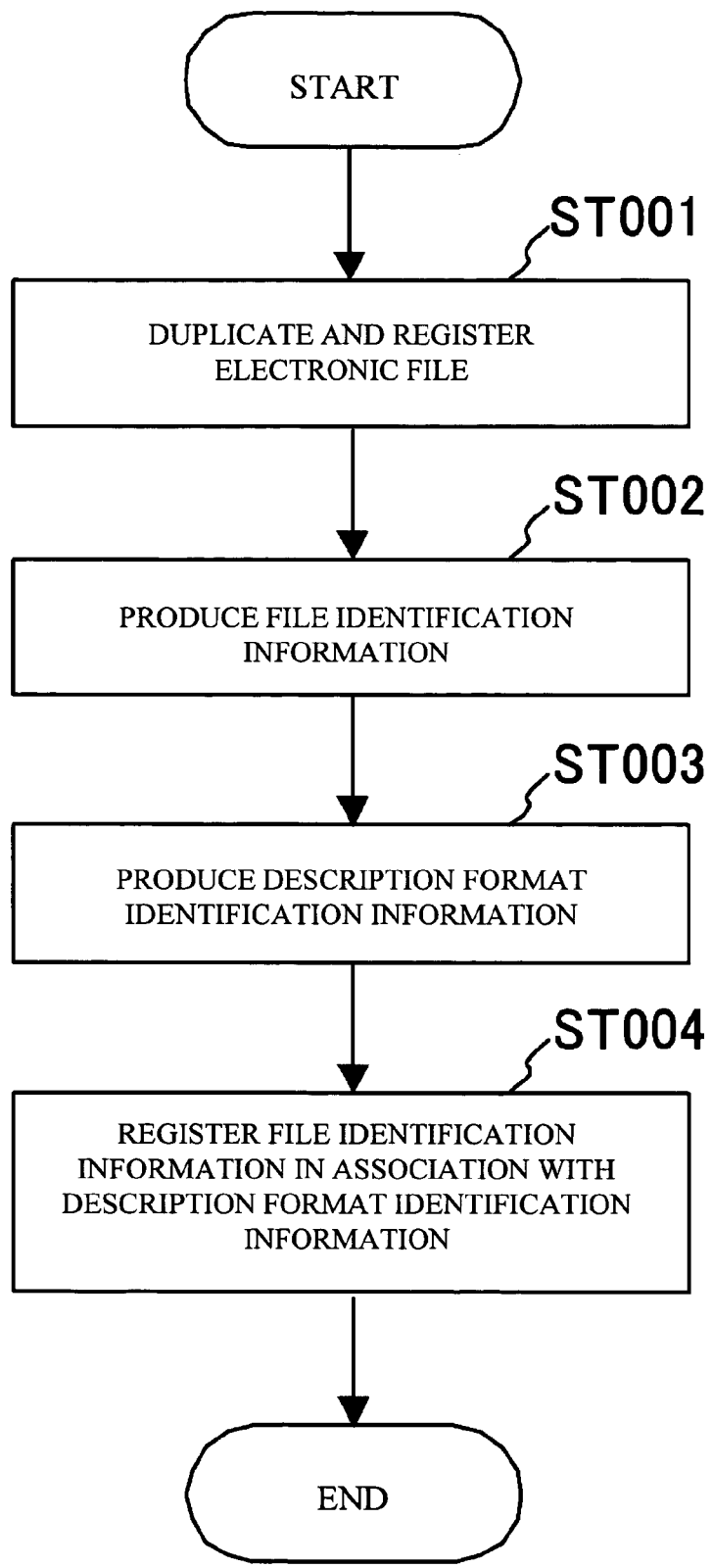
FIG. 3 is a flowchart showing an example of registration controlling process executed by a registration controller.

Referring now to FIG. 3, a description will be given of the registration controlling process performed by the registration controller 110. FIG. 3 is a flowchart showing an example of the registration controlling process executed by the registration controller 110.

Firstly, the registration controller 110 obtains an electronic file designated by a signal input from the input portion from the external memory device 104 or via the communication portion. Then, the registration controller 110 controls to copy and store such obtained electronic file in the memory portion (that is, register) (step ST001).

Next, the registration controller 110 generates file identification information, which is information to identify the electronic file to be controlled to copy and store in the memory portion (step ST002).

Then, the registration controller 110 generates description format identification information, which is information to identify a description format of the electronic file to be controlled to copy and store in the memory portion (step ST003). In the present exemplary embodiment, the description format identification information denotes combined information of a type of the electronic file and version information thereof.

In the present exemplary embodiment, the type of the electronic file is expressed by a Multipurpose Internet Mail Extensions Type (MIME Type).

More specifically, when the MIME Type has a header section of "application", the version information represents a version number of the application identified by the MIME Type. For example, when the header section is "video", the version information represents the version number of compression/expansion standard. Thereby, in the present exemplary embodiment, the combined information of the MIME Type and the version information may identify a file format, which is a file description format.

In more detail, the registration controller 110 obtains the name of the electronic file to obtain the MIME Type from an extension included in the name of the electronic file. Alternatively, the registration controller 110 may obtain the MIME Type from a signal input from the input portion, or may obtain the MIME Type by checking binary data in the header section or the like of the electronic file.

After that, the registration controller 110 controls to store in the memory portion, the file identification information produced in step ST002, in association with the description format identification information produced in step ST003 (step ST004).

Specifically, the registration controller 110 outputs to the file database 120 that manages the memory portion, a statement to cause the file identification information such as INSERT statement of SQL statement to be stored in the memory portion in association with the description format identification information. As stated, the registration controller 110 controls a management program which composes the file database 120 to manage information in the memory portion, and stores the file identification information in the memory portion in association with the description format identification information.

In addition, as will be described later, when the information is associated in such a manner that the file identification information and the description format identification information are stored in an identical line of the electronic file included in the memory portion, instead of managing the information in the memory portion by means of the file database 120, a statement, for example, such as a shell command statement or the like is output into the OS that manages the memory portion.

Herein, the memory portion is composed of, for example, the external memory device 104 such as a hard disk. An example of the memory portion, for example, may employ a configuration in which an external memory device connected to the registration controller 110 is composed of a flexible disk, and the registration controller 110 controls the electronic file in the flexible disk to be stored in the memory portion composed of the hard disk. That is, the external memory device 104 may be physically different from the external memory device connected to the registration controller 110.

On the other hand, for example, the external memory device 104 connected to the registration controller 110 and the memory portion may be composed of a physically identical hard disk, and the registration controller 110 may control the electronic file in a user directory in an identical hard disk to move to a system directory. That is, the memory portion may be an identical external memory device 104 connected to the registration controller 110.

The registration controller 110 takes control by outputting an instruction to the file database 120 that manages the memory portion, and does not directly manage the information of the memory portion.

The file database 120 is connected to the registration controller 110, the conversion registering portion 130, and the execution notifying portion 140. The file database 120 is composed of: the memory portion; and a program such as PostgreSQL that manages the information in the memory portion.

The file database 120 manages the information stored in the memory portion by controlling the management program with the registration controller 110, information referred to and reregistered (updated) by the conversion registering portion 130, and information referred to by the execution notifying portion 140.

Here, in order to explain the formation managed by the file database 120, Table 1 shows a table stored in the file database 120 as well as file table provided for managing the information stored in the memory portion by a control of the registration controller 110.

TABLE 1

| DOCUMENT ID | MIME TYPE | VERSION |
| --- | --- | --- |
| DOCUMENT-0001 | application/vnd.fujixeroxx.docuworksx | 5 |
| DOCUMENT-0002 | application/mswordx | 94 |
| DOCUMENT-0003 | application/mswordx | 95 |
| DOCUMENT-0004 | application/mswordx | 96 |
| DOCUMENT-0005 | application/mswordx | 2000 |
| DOCUMENT-0006 | application/mspowerpointx | 94 |
| DOCUMENT-0007 | application/mspowerpointx | 2000 |
| DOCUMENT-0008 | application/msexcelx | 94 |

Table 1 has a document ID column, a MIME Type column, and a version column. The document ID column accumulates the file identification information. The MIME Type column and the version column respectively accumulate the MIME Type and the version information of the electronic file identified by the file identification information accumulated in the document ID column of the same record. Table 1 does not include a record having the same file identification information accumulated in the document ID column.

Next, a description will now be given of a table referred to by the conversion registering portion 130. Table 2 is a program table showing to manage information on the program that converts the description format of the electronic file.

TABLE 2

| MIME TYPE | OLD VERSION | NEW VERSION | PROGRAM TO BE ACTIVATED |
|---|---|---|---|
| application/vnd.fujixeroxx.docuworksx | 5 | 6 | DocuWorksx Converter (5.0 To 6.0) |
| Application/mswordx | 95 | 2000 | Ms-Wordx Converter (95 To 2000) |
| application/mswordx | 97 | 2000 | Ms-Wordx Converter (97 To 2000) |

Table 2 has the MIME Type column, an old version column, a new version column, and a program to be activated column. Table 2 stores to associate the program to be activated column, the description format to be converted by the program to be activated column, and the description format of the electronic file to be output subsequent to the conversion.

The MIME Type column accumulates the MIME Type of the electronic file that is the conversion target of the program to be identified by the program identification information accumulated in the program to be activated column of the same record. A description will be given of the program identification information later.

The old version column accumulates the version information of the electronic file that is the conversion target of the program identified by the program identification information accumulated in the program to be activated column of the same record.

That is to say, the information accumulated in the MIME Type column and that accumulated in the old version column are respectively combined to represent the description format identification information that identifies the description format of the electronic file that is the conversion target of the program.

The new version column accumulates the version information on the electronic file to be converted and output by the program identified by the program identification information accumulated in the program to be activated column of the same record.

That is to say, the information accumulated in the MIME Type column and that accumulated in the new version column are respectively combined to represent the description format identification information that identifies the description format of the electronic file that is the conversion target of the program.

The program to be activated column accumulates the program identification information. Herein, the program identification information denotes information that identifies the conversion executing program which converts the electronic file having the description format identified by the description format identification information.

Table 2 does not include a record in which the program identification information accumulated in the program to be activated column and the information accumulated in the MIME Type column and the old version column are the same as those of another record.

Next, Table 3 will be shown here. Table 3 is a schedule table included in the file database 120 and to manage the information referred to by the execution notifying portion 140.

TABLE 3

| DOCUMENT ID | PROGRAM TO BE ACTIVATED |
|---|---|
| DOCUMENT-0001 | DocuWorksxConverter(5.0 To 6.0) |
| . | . |
| . | . |
| . | . |

Table 3 has the document ID column and the program to be activated column. The information accumulated in the document ID column and the program to be activated column is similar to the document ID column in the file table shown in Table 1 and the program to be activated column in the program table shown in Table 2. Therefore, a description thereof will be omitted here.

Referring back to FIG. 1, a description of the configuration of the electronic file conversion apparatus 100 will be continued. The conversion registering portion 130 is connected to the file database 120 and the execution notifying portion 140. The conversion registering portion 130 receives the file identification information in association with the program identification information from the execution notifying portion 140.

Next, the conversion registering portion 130 converts the description format of the electronic file to be identified by the received file identification information by executing the program to be identified by such received program identification information. Then, the conversion registering portion 130 controls the management program that composes the file database 120 to store in the memory portion, the converted electronic file, the file identification information of the converted electronic file, and the description format identification information thereof in association with each other.

Also, the conversion registering portion 130 may receive only the execution notification from the execution notifying portion 140. After that, the conversion registering portion 130 obtains the electronic file having the description format that can be converted by the conversion registering portion 130, out of electronic files registered in the memory portion that is managed by the file database 120, and then converts the description format of all of such obtained electronic files. Subsequently, the conversion registering portion 130 controls the program that composes the file database 120 to store in the memory portion, all of such converted electronic files in association with the file identification information of the converted electronic file and the description format identification information thereof.

Figure 4:
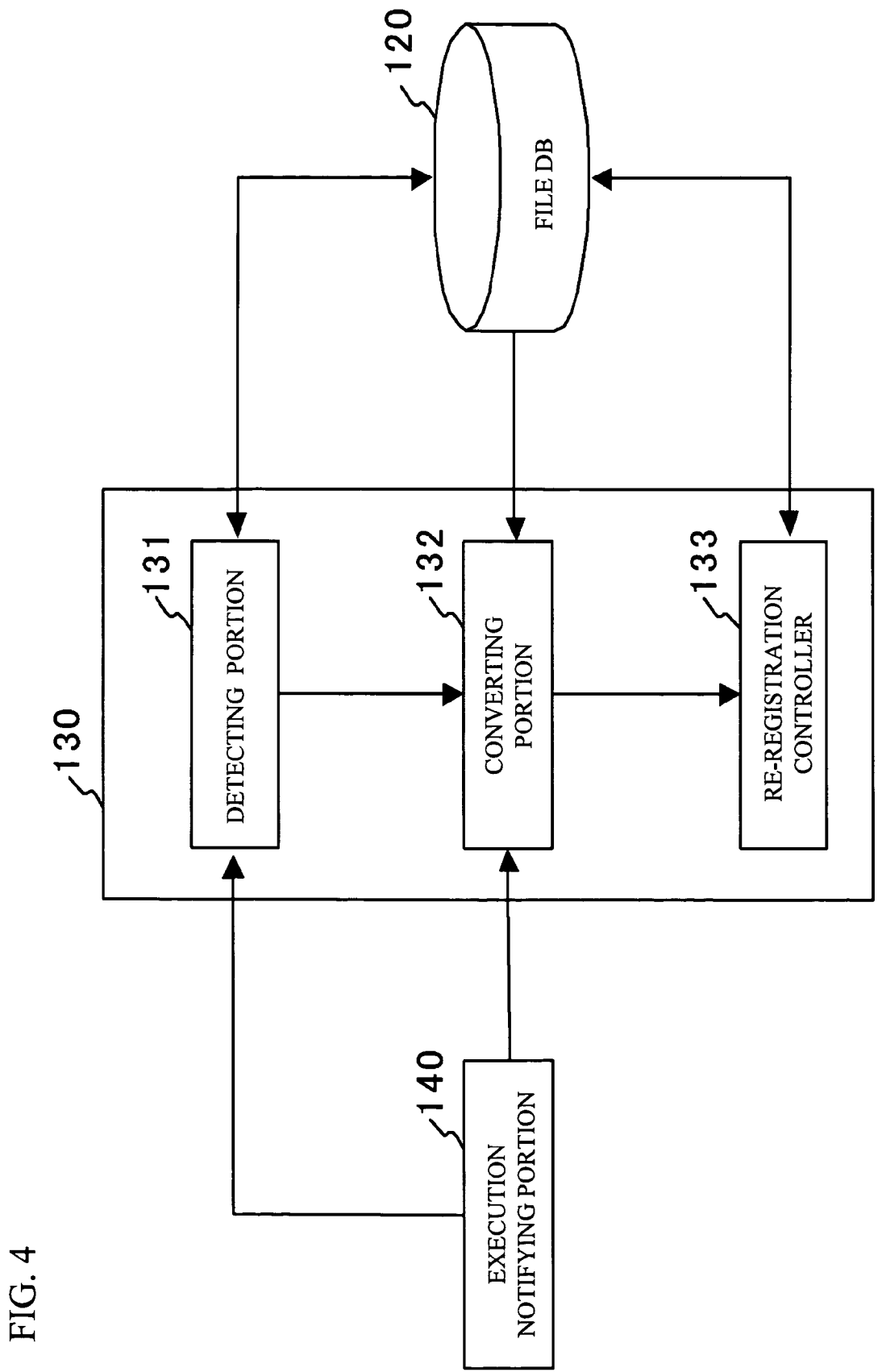
FIG. 4 is a diagram showing an example of a structure of a conversion registering portion in accordance with a first exemplary embodiment.

A description will be given of an example of a structure of the conversion registering portion 130 with reference to FIG. 4. FIG. 4 is a diagram showing an example of a structure of the conversion registering portion 130 employed in the first exemplary embodiment.

The conversion registering portion 130 is composed of: a detecting portion 131; a converting portion 132; and a re-registration controller 133. The detecting portion 131 is connected to: the file database 120; the converting portion 132; and the execution notifying portion 140.

The detecting portion 131 receives an execution notification from the execution notifying portion 140. Next, the detecting portion 131 executes a detection process to detect the electronic file having the description format that can be converted by the conversion execution program to be used for converting the electronic file.

Figure 5:
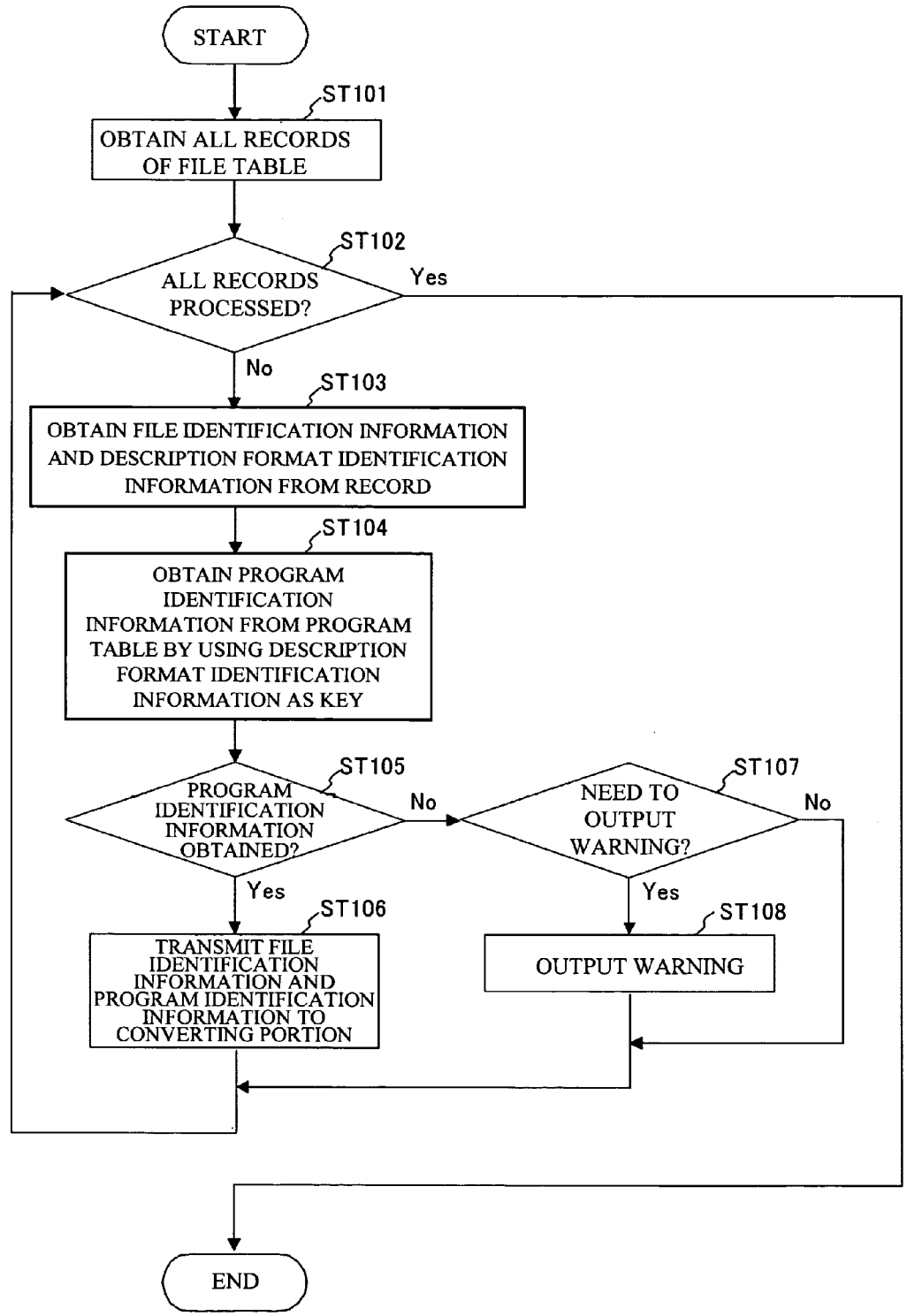
FIG. 5 is a flowchart showing an example of detection processing executed by a detecting portion.

Referring now to FIG. 5, a description will now be given of the detection process executed by the conversion registering portion 130. FIG. 5 is a flowchart showing an example of the detection process to be executed by the detecting portion 131.

Firstly, the detecting portion 131 obtains all records in the file table shown in Table 1 (step ST101). Next, the detecting portion 131 determines whether or not the processes from steps ST103 to ST108 are implemented on all such obtained records (step ST102). If it is determined that the processes from steps ST103 to ST108 are implemented on all such obtained records, the detecting portion 131 finishes the processing. If not, the detecting portion 131 executes the process of step ST103.

If it is not determined that the processes from steps ST103 to ST108 are implemented on all such obtained records, the detecting portion 131 selects one record from the records on which the processes are not performed, and obtains the file identification information accumulated in the document ID column, in the MIME Type column, and in the version column of the selected record (step ST103).

Next, the detecting portion 131 obtains the program identification information or the like from the program table shown in Table 2 by use of the description format identification information obtained in step ST103 as a key (step ST104). Specifically, the detecting portion 131 obtains the record in which the MIME Type and the version information that are the description format identification information obtained in step ST103 are respectively stored in the MIME Type column and the old version column in each program table, and further obtains the program identification information stored in the program to be activated column in such obtained record.

After that, the detecting portion 131 determines whether or not the program identification information is obtained in step ST 104 (step ST105). If it is determined that the program identification information is obtained, the detecting portion 131 executes the process of step ST106. If not, the detecting portion 131 implements the process of step ST107.

If it is determined that the program identification information is obtained in step ST105, the detecting portion 131 outputs the file identification information obtained in step ST103 and the program identification information obtained in step ST 104, to the converting portion 132 (step ST106). Next, the detecting portion 131 returns to step ST102 to repeat the above-described processing.

If it is determined that the program identification information is not obtained in step ST105, the detecting portion 131 determines whether or not a warning should be output (step ST107). If it is determined that the warning should be output, the detecting portion 131 implements step ST108. If not, the detecting portion 131 returns to step ST102 to repeat the above-described processing.

A description will now be given of a warning determining process that determines whether or not a warning should be output. Firstly, the detecting portion 131 refers to the file table included in the file database 120 to detect an electronic file having the same type of that of the electronic file to be processed but having a different description format therefrom.

Next, the detecting portion 131 determines whether or not such electronic file is detected. If it is determined that such electronic file is not detected, the detecting portion 131 determines that there is no need to issue a warning. If not, the detecting portion 131 obtains the conversion execution program that outputs the electronic file having the same description format as that of the electronic file to be processed by referring to the program table included in the file database 120.

If the conversion execution program is obtained, the detecting portion 131 determines that there is no need to issue a warning. If not, the detecting portion 131 determines that there is a need to issue the warning.

Here, a description will be given, with reference to Table 4, of a result of a warning determining process performed by the detecting portion 131, when the file database 120 has the file table shown in Table 1 and the program table shown in Table 2.

TABLE 4

| DOCUMENT ID | MIME TYPE | VERSION | NOTIFICATION |
| --- | --- | --- | --- |
| DOCUMENT-0001 | application/vnd.fujixeroxx.docuworksx | 5 | NO |
| DOCUMENT-0002 | application/mswordx | 94 | YES |
| DOCUMENT-0003 | application/mswordx | 95 | NO |
| DOCUMENT-0004 | application/mswordx | 96 | YES |
| DOCUMENT-0005 | application/mswordx | 2000 | NO |
| DOCUMENT-0006 | application/mspowerpointx | 94 | YES |
| DOCUMENT-0007 | application/mspowerpointx | 2000 | YES |
| DOCUMENT-0008 | application/msexcelx | 94 | NO |

Firstly, the electronic files identified by "DOCUMENT-0001" and "DOCUMENT-0003" can be converted by the conversion execution program identified by program identification information "DocuWorksx Converter (5.0 To 6.0)" and "Ms-Wordx Converter (95 To 2000)". Therefore, the detecting portion 131 determines that there is no need to issue a warning.

In the program table shown in Table 2, there is no conversion execution program that converts the electronic file identified by "DOCUMENT-0002" and "DOCUMENT-0004" through "DOCUMENT-0008".

However, in Table 1, there is no electronic file having an identical type of the MIME Type of "application/msexcelx", which is the type of the electronic file identified by "DOCUMENT-0008" and not having the version number of "94". Therefore, the detecting portion 131 determines that there is no need to issue a warning.

As an electronic file having an identical type of the MIME Type of "application/mswordx", which is the type of the electronic file identified by "DOCUMENT-0005" and having the version number different from the version number of "2000", there are "DOCUMENT-0002" through "DOCUMENT-0004" in the file table shown in Table 1.

However, in the program table shown in Table 2, there are the conversion execution programs (identification information is "Ms-Wordx Converter (95 To 2000)" or "Ms-Wordx Converter (97 To 2000)"), which converts and outputs the electronic file having an identical description format (that is, the identical MIME Type and the identical version information) of the electronic file identified by "DOCUMENT-0005". Therefore, the detecting portion 131 determines that there is no need to issue a warning.

There are identical electronic files respectively identified by "DOCUMENT-0002", "DOCUMENT-0004", "DOCUMENT-0006", and "DOCUMENT-0007" with different description formats therefrom. At the same time, there is no conversion execution program that outputs the electronic file having an identical description format. Therefore, the detecting portion 131 determines that there is a need to issue a warning.

If it is determined that there is a need to issue a warning, in step ST107, the detecting portion 131 issues a warning (step ST108). Then, the detecting portion 131 finishes the processing.

Specifically, the electronic file conversion apparatus 100, not shown, may further include, for example, a display portion such as a Cathode RayTube (CRT), a liquid crystal display, or the like. The display portion may display a warning message or the like notified from the detecting portion 131. Also, the electronic file conversion apparatus 100 may further include a sound producing portion such as a speaker or the like. The sound producing portion may produce a warning sound such as beep sound or the like in accordance with a notification from the detecting portion 131.

Referring back to FIG. 4, the description of the configuration of the conversion registering portion 130 will be continued. The converting portion 132 is connected to: the file database 120; the detecting portion 131; the re-registration controller 133; and the execution notifying portion 140. The converting portion 132 is provided with, for example, a program storing portion, not shown, composed of: the ROM 102; the RAM 103; or the external memory device 104. The program storing portion included in the converting portion 132 stores the conversion execution program that converts the description format of the electronic file into another description format.

The converting portion 132 implements a conversion process that converts the description format of the electronic file by executing the conversion execution program stored in the program storing portion.

Figure 6:
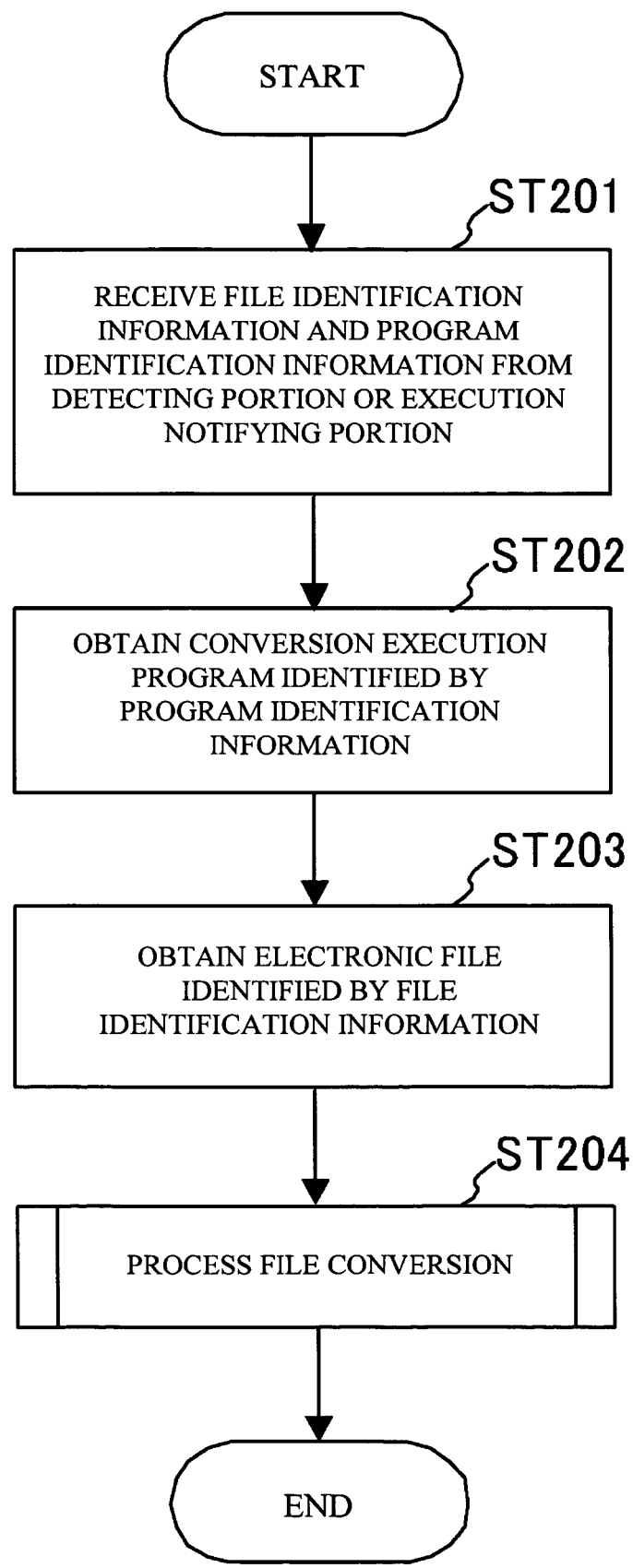
FIG. 6 is a flowchart showing an example of conversion processing executed by a converting portion.

Referring now to FIG. 6, a description will now be given of the conversion process to be executed by the converting portion 132. FIG. 6 is a flowchart showing an example of the conversion process to be executed by the converting portion 132.

Firstly, the converting portion 132 receives the file identification information and the program identification information from the detecting portion 131 or the execution notifying portion 140 (step ST201). The file identification information received by the converting portion 132 may be the file identification information of the electronic file stored in the memory portion when the registration controller 110 implements step ST001 to step ST004 shown in FIG. 3. Alternatively, the file identification information may be that of the electronic file stored in the memory portion when the re-registration controller 133 implements step ST401 to step ST403, described later.

Next, the converting portion 132 specifies the conversion execution program identified by such received program identification information (step ST202). After that, the converting portion 132 specifies the electronic file identified by such received file identification information (step ST203).

Then, the converting portion 132 implements the file conversion process that converts the electronic file specified in step ST203 by executing the conversion execution program specified in step S202 (step ST204). Subsequently, the converting portion 132 finishes the processing.

Figure 7:
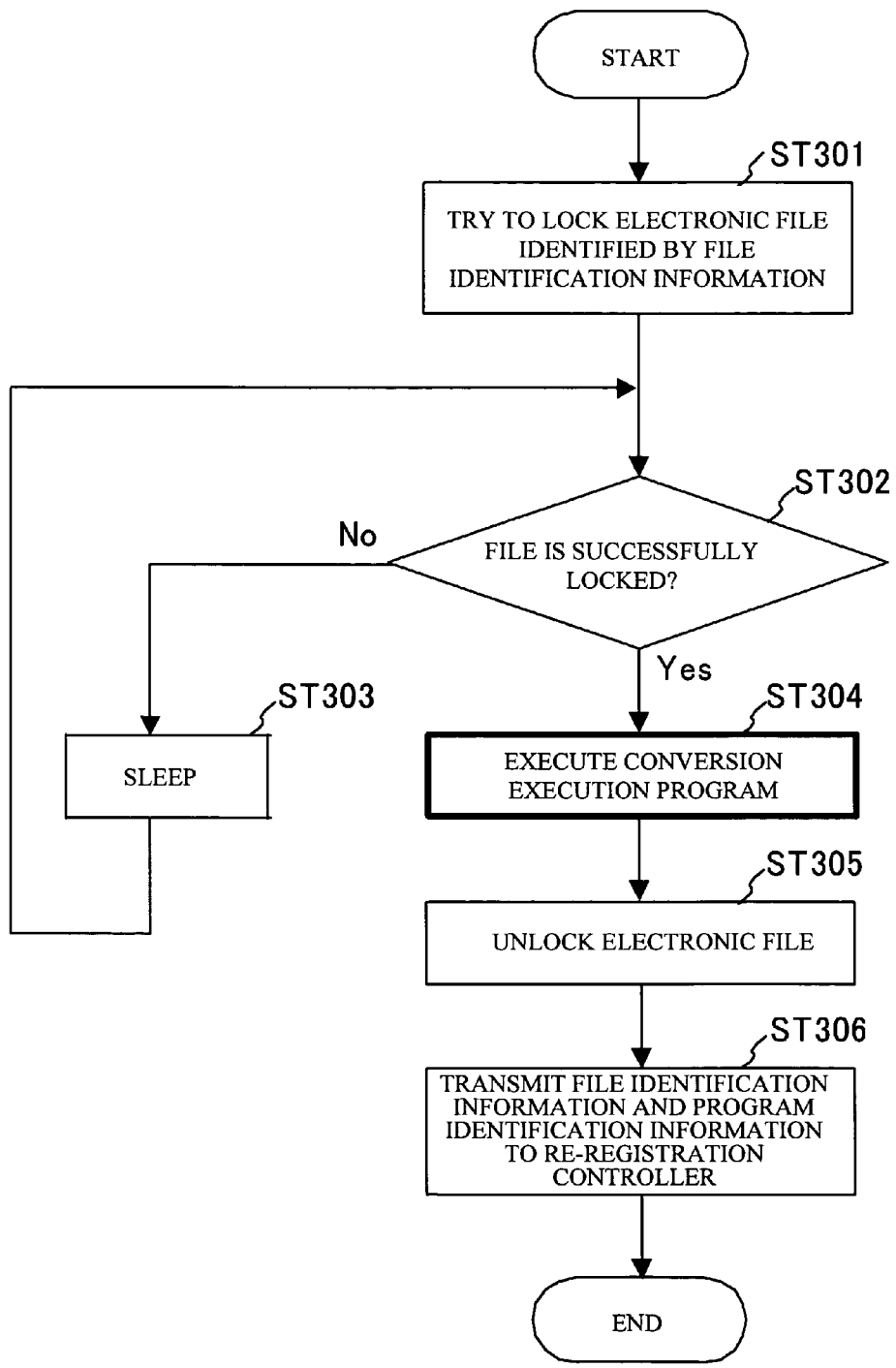
FIG. 7 is a flowchart showing an example of file conversion processing executed by the converting portion.

Referring now to FIG. 7, a description will be given of the file conversion process described in step ST204. FIG. 7 is a flowchart showing an example of the file conversion process implemented by the converting portion 132.

Firstly, the converting portion 132 tries to lock the electronic file identified by the file identification information received from the detecting portion 131 or the execution notifying portion 140 (step ST301).

The converting portion 132 determines whether or not the electronic file is locked (step ST302). If it is determined that the electronic file is locked, the converting portion 132 implements the process of step ST304. If not, the converting portion 132 implements the process of step ST303.

If it is determined that the electronic file is not locked in step ST302, the converting portion 132 comes into a sleep state for a given time (step ST303). Then, the converting portion 132 returns to step ST302 and repeats the above-described processing.

If it is determined that the electronic file is locked in step ST302, the converting portion 132 executes the conversion execution program identified by such received program identification information (step ST304). For example, by giving the file identification information of the electronic file to be converted as an argument to the conversion execution program, the conversion execution program is capable of converting the description format of the designated electronic file.

Here, steps ST201 to ST204 and steps ST301 to ST306 (described later partially) implemented by the converting portion 132, which are the steps to be implemented by the electronic file conversion apparatus 100 that is a computer by use of the file conversion program that is employed as an aspect of the invention. In other words, the above-described steps include the step (step ST304) in which the computer executes the conversion execution program.

More specifically, in the present exemplary embodiment, the file conversion program may be a program other than the file conversion program as well as a program wrapping a program that includes the conversion execution program.

In addition, in the present exemplary embodiment, the file conversion program may be a program other than the file conversion program as well as a program that dynamically links a library program that includes the conversion execution program.

Here, the converting portion 132 converts the description format of the electronic file to be converted to, for example, a description format that can be recognized by the same type of program such as an application identified by the MIME Type. That is, more specifically, the converting portion 132 converts the file format that can be recognized by a specific application with a specific version into the file format that can be recognized by the same application with a different version.

Next, the converting portion 132 releases the lock of the electronic file to be converted (step ST305). Then, the converting portion 132 outputs such received file identification information and such received program identification information to the re-registration controller 133 (step ST306). After that, the converting portion 132 finishes the processing.

Referring back to FIG. 4 again, the configuration of the conversion registering portion 130 will be continued. The re-registration controller 133 is connected to: the converting portion 132; and the file database 120. The re-registration controller 133 implements a re-registration controlling process to control to store in the memory portion, the electronic file received from the converting portion 132 having the description format changed.

In the present exemplary embodiment, the description has been given of the case where the file table shown in Table 1 is included, and the detecting portion 131 detects the electronic file that can be converted by the conversion execution program by referring to the file table. However, the present invention is not limited thereto. For example, the present invention may employ a configuration in which the file table is not included and the detecting portion 131 detects the electronic file that can be converted by the conversion execution program by sequentially checking the extension of the electronic file stored in the memory portion and the header section of the electronic file.

Figure 8:
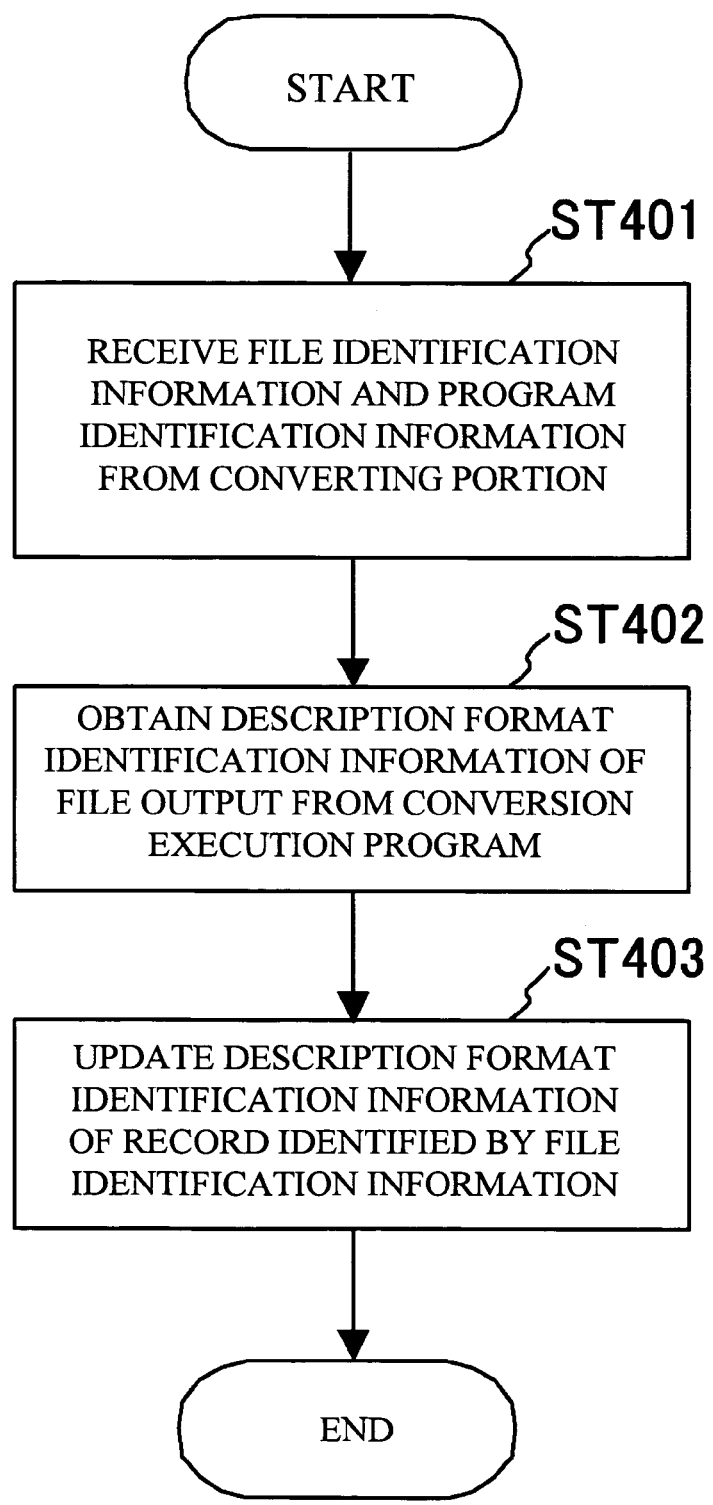
FIG. 8 is a flow chart showing an example of re-registration controlling process executed by a re-registration controller.

Referring now to FIG. 8, a description will be given of the re-registration controlling process implemented by the re-registration controller 133. FIG. 8 is a flowchart showing an example of the re-registration controlling process implemented by the re-registration controller.

Firstly, the re-registration controller 133 receives the file identification information and the program identification information from the converting portion 132 (step ST401). The re-registration controller 133 obtains the description format identification information of the electronic file, which is identified by the file identification information received in step ST401 and which is converted and output by the conversion execution program (step ST402).

Specifically, the re-registration controller 133 refers to the program table shown in Table 2 managed by the file database 120 to obtain the record in which the program identification information received in step ST401 is accumulated, and obtains the MIME Type and the version information from the MIME Type column and the new version column of such obtained record to obtain the description format identification information.

Then, the re-registration controller 133 obtains the record in which the file identification information received in step ST401 is accumulated in the document ID column from the record of the file table shown in Table 1 of the file database 120. The re-registration controller 133 controls the description format identification information accumulated in such obtained record (specifically, information accumulated in the MIME Type column and in the version information column) to be updated to the description format identification information obtained in step ST402 (step 403). After that, the re-registration controller 133 finishes the processing.

In the present exemplary embodiment, the re-registration controller 133 controls the electronic file, which is not converted, stored in the memory portion to be overwritten by the electronic file which is converted and output by the converting portion 132, and controls to commonly store in the memory portion, the file identification information of the electronic file having the converted description format and the file identification information of the electronic file having the description format prior to the conversion. Also, the converting portion 132 may directly overwrite and output the electronic file that is not converted.

The re-registration controller 133 may control to store in the memory portion, the electronic file that is converted and output by the converting portion 132 as a different electronic file from the electronic file, which is not converted, stored in the memory portion. In an exemplary embodiment in which overwriting is not employed, the re-registration controller 133 may control to store in the memory portion, the file identification information of the electronic file having the converted description format separately from the file identification information of the electronic file having the description format prior to the conversion.

Next, referring back to FIG. 1, the description of the electronic file conversion apparatus 100 will be continued. The execution notifying portion 140 is connected to the conversion registering portion 130. The execution notifying portion 140 implements an execution notifying process to notify the timing to exchange the electronic file to the conversion registering portion 130.

Figure 9:
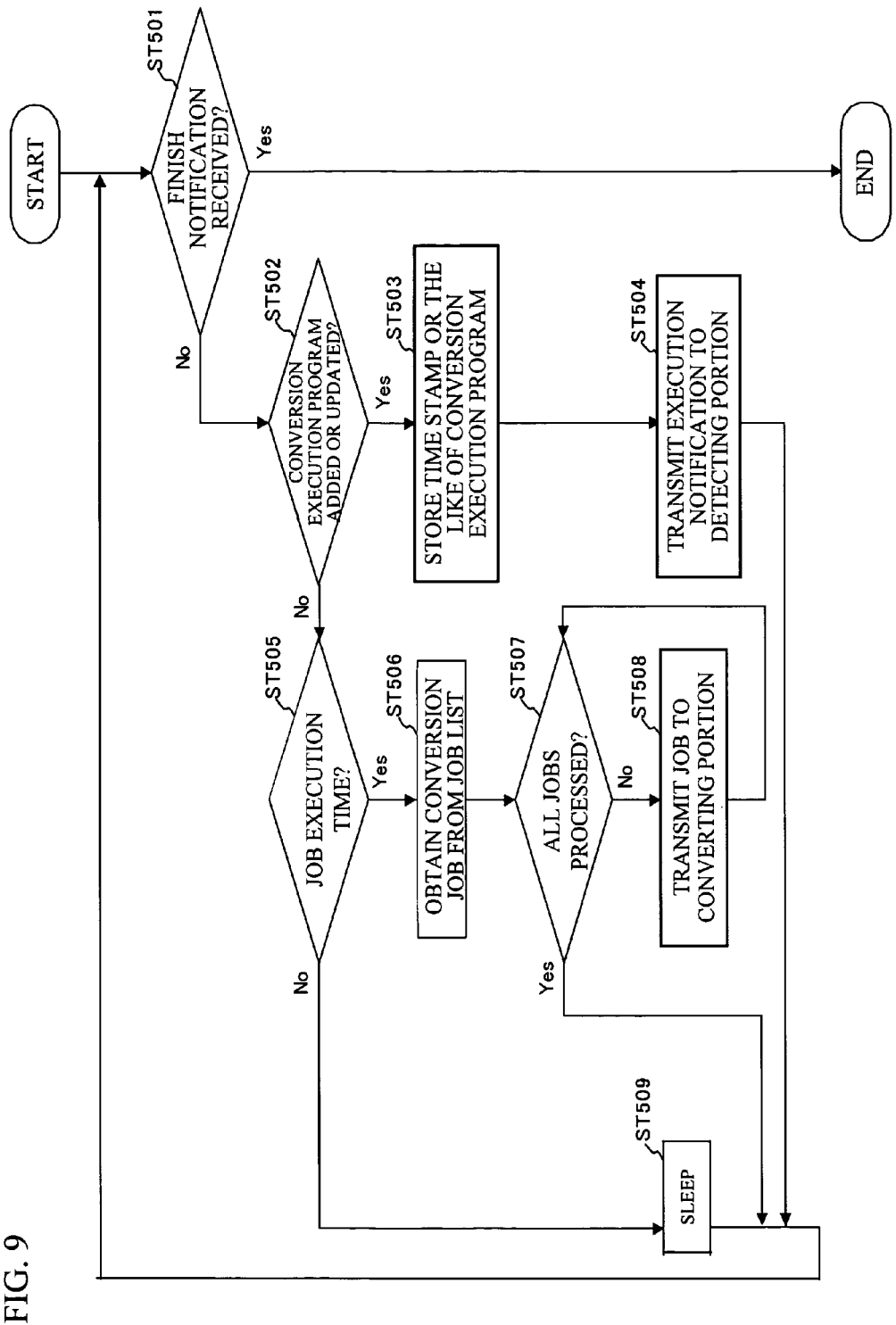
FIG. 9 is a flowchart showing an example of execution notification processing executed by an execution notifying portion.

Referring now to FIG. 9, a description will be given of the execution notifying process implemented by the execution notifying portion 140. FIG. 9 is a flowchart showing an example of the execution notifying process implemented by the execution notifying portion.

Firstly, the execution notifying portion 140 determines whether or not a finish notification is received (step ST501) If it is determined that the finish notification is received, the execution notifying portion 140 finishes the processing. If not, the execution notifying portion 140 implements the process of step ST502.

If it is determined that the finish notification is not received in step ST501, the execution notifying portion 140 determines whether or not the conversion execution program is added or updated (step ST502). If it is determined that the conversion execution program is added or updated, the execution notifying portion 140 executes the process of step ST503. If not, the execution notifying portion 140 executes the process of step ST505.

Specifically, for example, the execution notifying portion 140 checks a time stamp, a file size, or file name of the conversion execution program (hereinafter, simply referred to as time stamp or the like), compares the result with the already stored value (or a default value at the time of initial start-up), and detects the update of the conversion execution program.

Also, the execution notifying portion 140 stores a list of the conversion execution programs existing in a directory storing the conversion execution programs in advance, compares the stored list (or a list set as a default at the time of initial start-up) with the list of the conversion execution programs actually existing in the directory, and thereby detects the addition of the conversion execution program.

If it is determined that the conversion execution program is added or updated in step ST502, the execution notifying portion 140 stores the list or the time stamp or the like of the conversion execution programs (step ST503). Next, the execution notifying portion 140 notifies an execution notification to the detecting portion 131 (step ST504). After that, the execution notifying portion 140 returns to the above-described step ST501 to repeat the above processing.

If it is determined that the conversion execution program is not added or updated in step ST502, the execution notifying portion 140 obtains a system time, and determines whether or not such obtained system time has passed a predetermined time (hereinafter, simply referred to as job execution time) (step ST505). If it is determined that the system time has passed the predetermined time, the execution notifying portion 140 implements the process of step ST506. If not, the execution notifying portion 140 implements the process of step ST509.

If it is determined that the system time has passed the job execution time in step ST505, the execution notifying portion 140 refers to the schedule table shown in Table 3 managed by the file database 120, and obtains all records included in the schedule table (step ST506).

The file identification information and the program identification information stored in the record included in the schedule table are referred to as job, which specifies a process to be implemented by the conversion registering portion 130.

Next, the execution notifying portion 140 determines whether or not the process of step ST508 is executed for all the records obtained in step ST506 (step ST507). If it is determined that the process of step ST508 is implemented for all the records obtained in step ST506, the execution notifying portion 140 returns to step ST501 to repeat the above-described processing. If not, the execution notifying portion 140 implements the process of step ST508.

If it is determined that the process of step ST508 is not implemented for all the records obtained in step ST507, the execution notifying portion 140 outputs the file identification information and the program identification information (job) storing an unprocessed record, to the converting portion 132 (step ST508). Then, the execution notifying portion 140 returns to step ST507, and repeats the above-described processing.

If it is determined that the system time has not passed the job execution time in step ST505, the execution notifying portion 140 comes into a sleep state for a given time (step ST509). After that, the execution notifying portion 140 returns to step ST501, and repeats the above-described processing.

Second Exemplary Embodiment

A description will be given of a second exemplary embodiment of the invention, with reference to the attached drawings. The second exemplary embodiment is an exemplary embodiment of an electronic file conversion system with an electronic file storage apparatus 200 that stores a duplicate electronic file of the electronic file managed by the electronic file conversion apparatus 100 described in the first exemplary embodiment.

Figure 10:
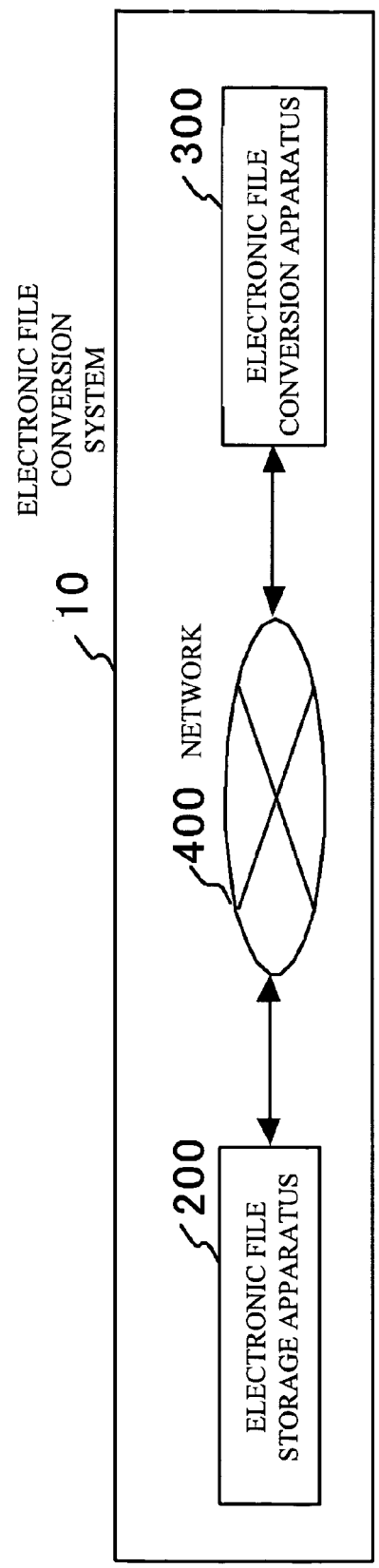
FIG. 10 is a functional block diagram showing an exemplary embodiment of an electronic file conversion system in accordance with an aspect of the invention.

FIG. 10 is a configuration diagram showing an exemplary embodiment of an electronic file conversion system 10 according to an aspect of the invention. The electronic file conversion system 10 is composed of: the electronic file storage apparatus 200; an electronic file conversion apparatus 300; and a network 400. The electronic file storage apparatus 200 and the electronic file conversion apparatus 300 are communicably connected to each other via the network 400.

Figure 11:
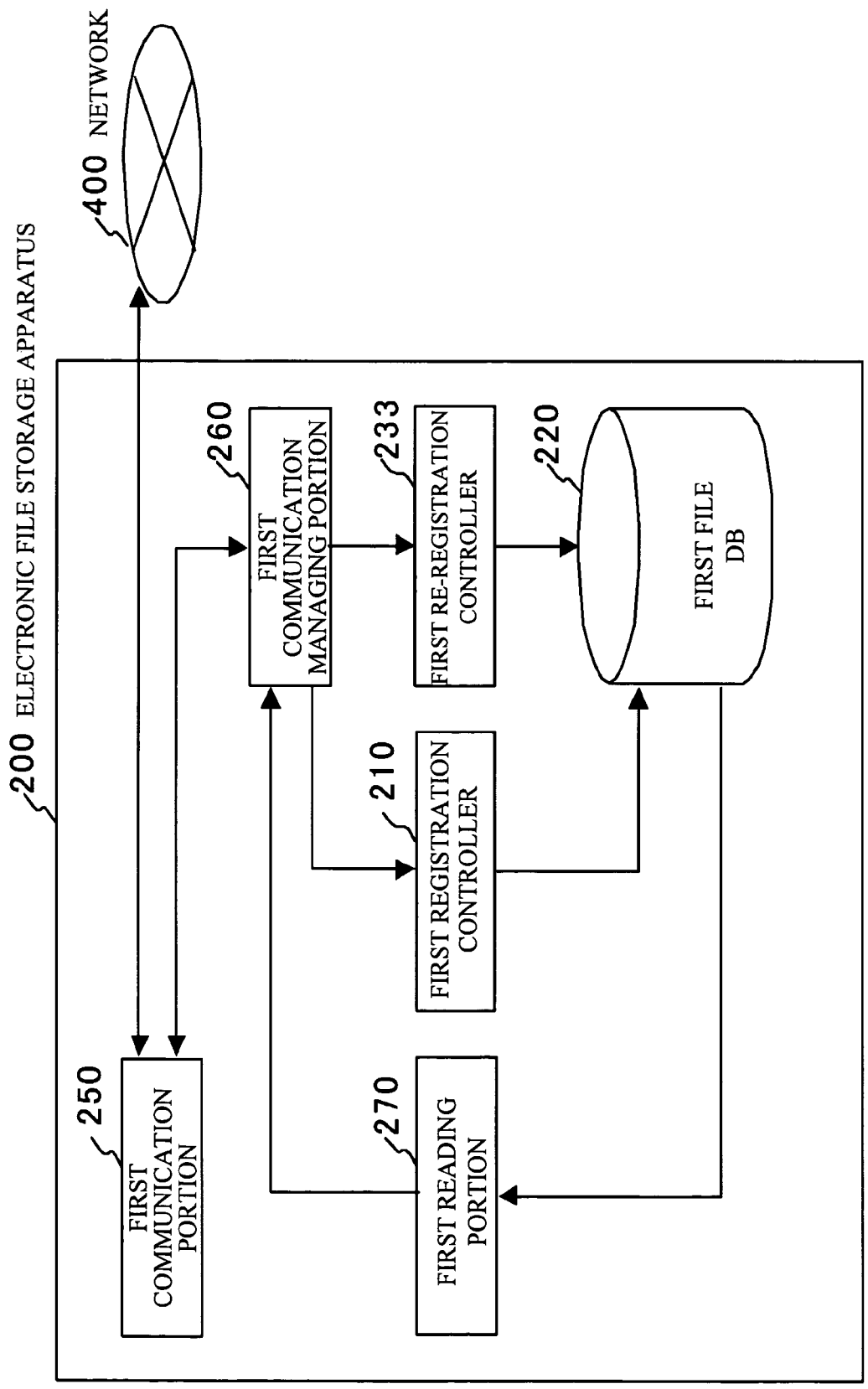
FIG. 11 is a functional block diagram showing an example of a structure of an electronic file storage apparatus.

Next, referring to FIG. 11, a description will be given of a configuration of the electronic file storage apparatus 200. FIG. 11 is a functional block diagram showing an example of the configuration of the electronic file storage apparatus 200.

The electronic file storage apparatus 200 is composed of, for example, a personal computer or the like. The electronic file storage apparatus 200 is composed of: a first registration controller (first controller) 210; a first file database 220; a first re-registration controller 233; a first communication portion (first transmitting portion, first receiving portion) 250; a first communication managing portion 260; and a first reading portion 270.

The connection, the configuration, and the function of the first registration controller 210, those of the first file database 220, and those the first re-registration controller 233 are respectively similar to those of the registration controller 110, those of the file database 120, and those the first re-registration controller 233 described in FIG. 1 and FIG. 4. Therefore, the description thereof will be omitted, and only the different points will be described.

The first registration controller 210 is connected not only to the first file database 220 but also to the first communication managing portion 260. The first registration controller 210 controls to obtain an electronic file received by the first communication portion 250, from the communication managing portion 260 and duplicate and stored such obtained electronic file in a first memory portion.

Since the first memory portion has a configuration similar to that of the memory portion described in the first exemplary embodiment, the description thereof will be omitted. The first memory portion composes the electronic file storage apparatus 200, yet does not compose the electronic file conversion apparatus 300, described later. The first memory portion is physically different from a second memory portion, described later.

The first file database 220 is connected not only to the first registration controller 210 and the first re-registration controller 233 but also to the first reading portion 270. Also, the first file database 220 is different from the file database employed in the first exemplary embodiment in that the first file database 220 is not connected to the execution notifying portion 140. The first file database 220 is different from the file database employed in the first exemplary embodiment in that the first file database 220 has only the file table shown in Table 1 described in the first exemplary embodiment.

The file table shown in Table 1 of the first file database 220 is referred to by the first reading portion 270 instead of the detecting portion 131 described in the first exemplary embodiment.

The first re-registration controller 233 is connected not only to the first file database 220 but also to the first communication managing portion 260. The first re-registration controller 233 controls to obtain an electronic file and the identification information thereof, the electronic file having the description format converted by a conversion registering portion 330 included in the electronic file conversion apparatus 300, described later, and being received by the first communication portion 250, and store such obtained electronic file in association with the electronic file identification information in the first memory portion.

The first communication portion 250 is, for example, composed of a network adaptor. The first communication portion 250 is connected to: the first registration controller 210; the first file database 220; the first re-registration controller 233; and the electronic file conversion apparatus 300, via the network 400.

The first communication portion 250 receives an electronic file having a description format prior to the conversion, from the electronic file conversion apparatus 300. Next, the first communication portion 250 outputs such received electronic file to the first communication managing portion 260.

In addition, the first communication portion 250 transmits to the electronic file conversion apparatus 300, the electronic file, which is stored in the first memory portion by means of the first registration controller 210 or the first re-registration controller 233, is requested to transmit to the electronic file conversion apparatus 300, and is read by the first reading portion 270 from the first memory portion managed by the first file database 220.

Then, the first communication portion 250 receives such transmitted electronic file that has the converted description format, from a second communication portion (second transmitting portion, second receiving portion) 350 included in the electronic file conversion apparatus 300. After that, the first communication portion 250 outputs such received electronic file converted, to the first communication managing portion 260.

The first communication managing portion 260 and the first reading portion 270 may be realized by software control executed by the electronic file storage apparatus 200. Since the software control executed by the electronic file storage apparatus 200 is similar to the software control performed by the electronic file conversion apparatus 100 described in the first exemplary embodiment, the description thereof will be omitted.

The first communication managing portion 260 is connected to: the first registration controller 210; the first re-registration controller 233; the first communication portion 250; and the first reading portion.

The first communication managing portion 260 obtains both or one of the electronic file and the electronic file identification information from the first communication portion 250.

If the first communication managing portion 260 obtains only the electronic file, the first communication managing portion 260 outputs such obtained electronic file to the first registration controller 210.

If the first communication managing portion 260 obtains both of the electronic file and the electronic file identification information, the first communication managing portion 260 outputs both of such obtained electronic file and obtained electronic file identification information to the first re-registration controller 233.

If the first communication managing portion 260 obtains only the electronic file identification information, the first communication managing portion 260 outputs such obtained electronic file identification information to the first reading portion 270. Then, the first communication managing portion 260 obtains the electronic file read by the first reading portion 270, and outputs such obtained electronic file and obtained electronic file identification information to the electronic file conversion apparatus 300 via the first communication portion 250.

The first reading portion 270 is connected to: the first file database 220; and the first communication managing portion 260. The first reading portion 270 obtains the file identification information from a second communication managing portion 360, reads the electronic file identified by such obtained file identification information from the first memory portion managed by the first file database 220, and outputs such read electronic file to the first communication managing portion 260.

Figure 12:
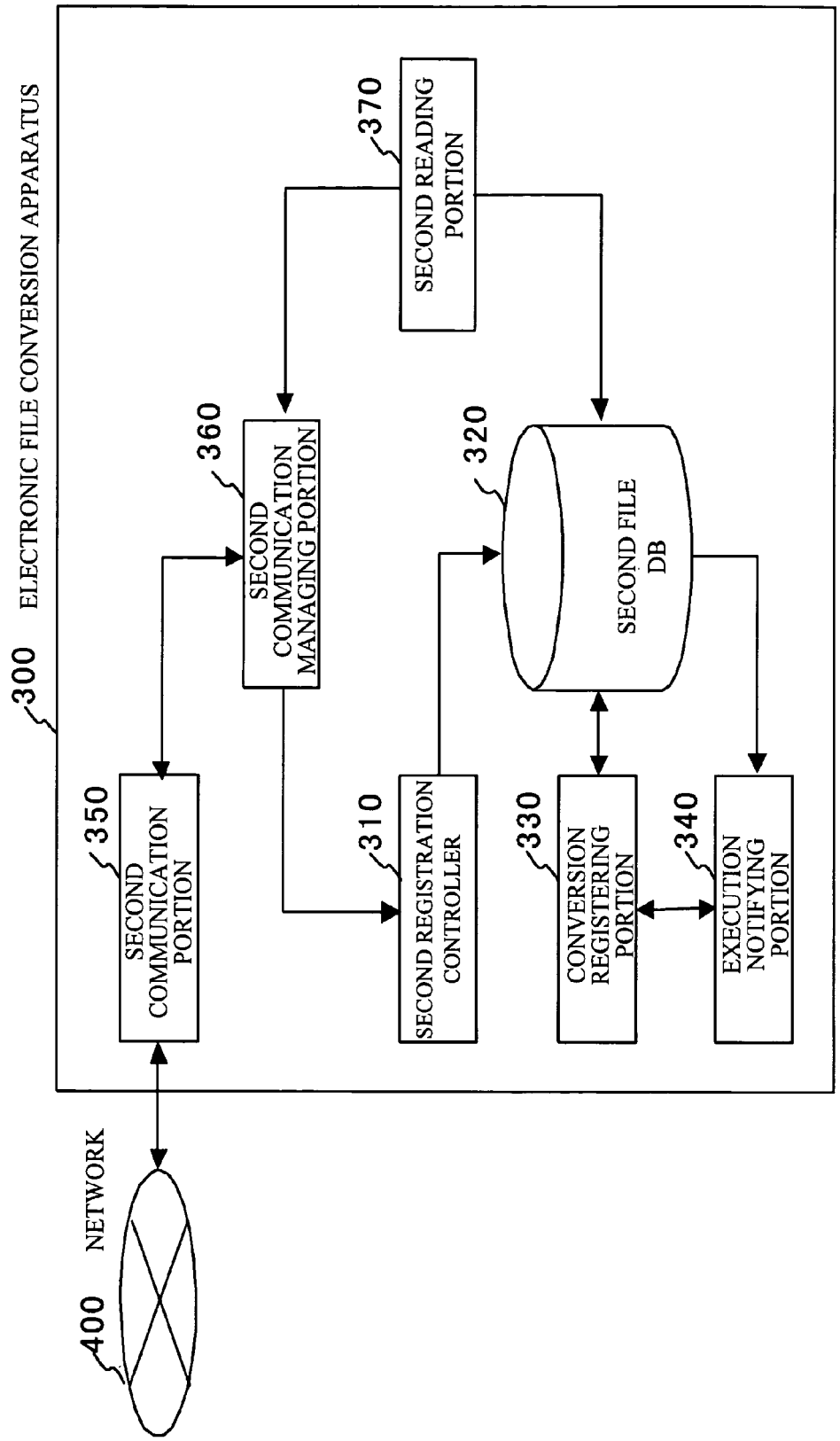
FIG. 12 is a functional block diagram showing an example of a structure of an electronic file conversion apparatus in accordance with a second exemplary embodiment.

Referring now to FIG. 12, a description will be given of a configuration of the electronic file conversion apparatus 300. FIG. 12 is a functional block diagram showing an example of the configuration of the electronic file conversion apparatus 300.

The electronic file conversion apparatus 300 is composed of, for example, a personal computer or the like. The electronic file conversion apparatus 300 is composed of: a second registration controller (second controller) 310; a second file database 320; the conversion registering portion 330; an execution notifying portion 340; the second communication portion 350; a second communication managing portion 360; and a second reading portion 370.

The connection, the structure, and the function of the second registration controller 310, those of the second file database 320, those of the conversion registering portion 330, and those of the execution notifying portion 340 are respectively almost similar to those of the registration controller 110, those of the file database 120, those of the conversion registering portion 130, and those of the execution notifying portion 140 described in FIG. 1 and FIG. 4. Therefore, the description thereof will be omitted, and only the different points will be described.

Also, the connection, the structure, and the function of the second communication portion 350, those of the second communication managing portion 360, and those of the second reading portion 370 are respectively almost similar to those of the first communication portion 250, those of the first communication managing portion 260, and those of the first reading portion 270 described in FIG. 11. Therefore, the description thereof will be omitted, and only the different points will be described.

The second registration controller 310 is connected not only to the second file database 320 but also to the second communication managing portion 360. The second registration controller 310 obtains the electronic file received by the second communication portion 350, from the second communication managing portion 360, and registers such obtained electronic file in the second memory portion.

Since the second memory portion has a configuration similar to that of the memory portion described in the first exemplary embodiment, the description thereof will be omitted. Also, the second memory portion composes the electronic file conversion apparatus 300, and does not compose the electronic file storage apparatus 200, described above.

The second file database 320 is different from the file database employed in the first exemplary embodiment in that the second file database 320 is connected not only to the second registration controller 310 and the second re-registration portion that composes the conversion registering portion 330 (third controller) but also to the second reading portion 370.

The second file database 320 has: as in the first exemplary embodiment, the file table; the program table; and the schedule table, shown in Tables 1 through 3. The file table shown in Table 1 of the second file database 320 is referred to by the second reading portion 370.

The second communication portion 350 receives the electronic file transmitted from the first communication portion 250 included in the electronic file storage apparatus 200, and outputs such received electronic file to the second communication managing portion 360.

Also, the second communication portion 350 obtains from the second communication managing portion 360, the electronic file that is controlled to be stored in the second memory portion by the second registration controller 310 or the electronic file that is stored in the second memory portion after the description format is converted by the conversion registering portion 330. Then, the second communication portion 350 transmits such obtained electronic file to the electronic file storage apparatus 200.

The second communication managing portion 360 is different from the first communication managing portion 260 in that the second communication managing portion 360 is not connected to the portion corresponding to the first re-registration controller 233.

Referring back to FIG. 10, the configuration of the electronic file conversion system 10 will be described continuously. The network 400 is composed of, for example, a Local Area Network (LAN) or a Wide Area Network (WAN). The network 400 is communicatively connected to: the electronic file storage apparatus 200; and the electronic file conversion apparatus 300.

It is possible to accomplish the functionalities of the electronic file conversion apparatus 100 by causing the operation portion 101 to execute the program stored in at least one of the ROM 102, the RAM 103, and the external memory device 104. The program may be provided by storing in a magnetic disk, an optical disk, a semiconductor memory, or another recording medium, or by distributing over a network.

While exemplary embodiments of the invention have been described, the invention is not limited to the specific exemplary embodiments, and various modifications and variations may be made without departing from the scope of the invention.

In the above-described exemplary embodiment, the description has been given of the case where the registration controller 110 controls to duplicate and store the electronic file in the memory portion in step ST001 shown in FIG. 3.

However, the invention is not limited thereto. For example, it may be controlled to cut and store the electronic file in the memory portion, without duplicating or copying it.

In the above-described exemplary embodiment, the description has been given of the case where the converting portion 132 converts the description format of the electronic file to be converted to the description format that can be recognized by an identical program. However, the invention is not limited thereto. For example, the converting portion 132 may convert the description format of the electronic file to a description format that can be recognized by different types of programs, the program table included in the file database 120 may store information identifying the program that can recognize the description format of the file subsequent to the conversion (that is, a new MIME Type) in association with a new version, and the re-registration controller 133 may control to store in the memory portion, the identification information of the electronic file having such converted description format and the version information in association with the new MIME Type.

In the above-described exemplary embodiment, the description has been given of the case where the file database 120 is composed of a database and information is associated by storing as an identical record. However, the invention is not limited thereto. For example, the file database 120 may associate information by storing the information in an identical line of the electronic file so as to manage the information.

In the above-described exemplary embodiment, the description has been given of the case where an external memory device is composed of a hard disk. However, the invention is not limited thereto. For example, the external memory device may be composed of a flexible disc, a Compact Disc Read Only Memory (CD-ROM), a Digital Versatile Disk Read Only Memory (DVD-ROM), a Digital Versatile Disk Random Access Memory (DVD-RAM), a Magneto-Optic (MO), or a flash memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic file conversion program product, said electronic file conversion program product embodied as a tangible computer-readable medium having a program embodied thereon, which when the program is executed by a computer, the program causes the computer to perform a method of converting an electronic file, the method comprising:

detecting a description format of an electronic file to be converted;

converting the electronic file and the detected description format of the electronic file stored in a memory; and storing in the memory, the converted electronic file and the converted description format of the electronic file, wherein the description format comprises a type of the electronic file and a version of the type of the electronic file, the version representing a version of an application identified by an MIME Type, and wherein when the detected description format of the electronic file is converted, the version of the type of the electronic file is converted into a new version of the type of the electronic tile, and the type of the electronic file is maintained.

2. The electronic file conversion program product according to claim 1, wherein:

the converting of the description format of the electronic file is performed by causing the computer to execute a conversion execution program that converts the description format of the electronic file to another description format; and the converting of the description format of the detected electronic file is performed if the conversion execution program is added to the memory or updated in the memory.

3. The electronic file conversion program product according to claim 1, the method further comprising:

if an electronic file having a file type recognized by the file conversion program product and a description format that is not convertible by the file conversion program product, outputting a notification.

4. An electronic file conversion system comprising an electronic file conversion apparatus, the file conversion apparatus comprising:

a memory which stores an electronic file that is to be converted;

a detecting portion that detects, from the memory, a description format of the electronic file which is to be converted;

a converting portion that converts the electronic file stored in the memory and the description format of the electronic file detected by the detecting portion; and a controller that stores in the memory, the converted electronic file and the converted description format of the electronic file that are converted by the converting portion, wherein the description format comprises a type of the electronic file and a version of the type of the electronic file, the version representing a version of an application identified by an MIME Type, and wherein when the converting portion converts the description format of the electronic file, the version of the type of the electronic file is converted into a new version of the type of the electronic file, and the type of the electronic file is maintained.

5. The electronic file conversion system according to claim 4, wherein the converting portion converts the description format of the electronic file by executing a conversion execution program that converts the description format of the electronic file to another description format; and the converting portion converts the description format of the electronic file detected by the detecting portion if the conversion program is added to the memory or updated in the memory.

6. The electronic file conversion system according to claim 4, wherein if the detecting portion detects an electronic file having a file type recognized by the file conversion system and a description format that is not convertible by the file conversion system, the detecting portion outputs a notification.

7. An electronic file conversion system having an electronic file storage apparatus and an electronic file conversion apparatus comprising:

an electronic file storage apparatus including:

a first memory that stores an electronic file;

a first transmitting portion that transmits the electronic file stored in the first memory to the electronic file conversion apparatus; and a first receiving portion that receives an electronic file from the first memory or the electronic file conversion apparatus;

the electronic file conversion apparatus including:

a second receiving portion that receives the electronic file transmitted by the first transmitting portion;

a second memory that stores the electronic file received by the second receiving portion;

a second transmitting portion that transmits the electronic file stored in the second memory to the first receiving portion;

a detecting portion that detects, from the second memory, a description format of the electronic file which is to be converted, the description format comprising a type of the electronic file and a version of the type of the electronic file, the version representing a version of an application identified by an MIME Type; and a converting portion that converts the electronic file and the description format of the electronic file detected by the detecting portion, wherein:

the second transmitting portion transmits the electronic file converted by the converting portion to the first receiving portion, and the first memory stores the converted electronic file received by the first receiving portion, and wherein when the converting portion converts the description format of the electronic file, the version of the type of the electronic file is converted into a new version of the type of the electronic file, and the type of the electronic file is maintained.

8. A method for converting an electronic file comprising:

detecting, a description format of an electronic file to be converted;

converting the electronic file and the detected description format of the electronic file stored in a memory; and storing in the memory, the converted electronic file and the converted description format of the electronic file, wherein the description format comprises a type of the electronic file and a version of the type of the electronic file, the version representing a version of an application identified by an MIME Type, and wherein when the detected description format of the electronic file is converted, the version of the type of the electronic file is converted into a new version of the type of the electronic file, and the type of the electronic file is maintained.

9. The method of claim 8, wherein the type of the electronic file is expressed by a Multipurpose Internet Mail Extensions Type (MIME Type).

10. The method of claim 8, further comprising:

determining whether the electronic file is locked prior to converting the description format of the electronic file;

if it is determined that the electronic file is locked, converting the electronic file and the description formation of the electronic file; and if it is determined that the electronic file is unlocked, delaying conversion of the description format of the electronic file for a predetermined period of time if the electronic file is not able to be locked.

11. The electronic file conversion system according to claim 4, wherein the converting portion comprises a memory that stores a conversion execution program that converts the description format of the file which is to be converted into a converted description format.

12. An electronic file conversion program product, said electronic file conversion program product embodied as a tangible computer-readable medium having a program embodied thereon, which when the program is executed by a computer, the program causes the computer to perform a method of converting an electronic file, the method comprising:

associating a type of an electronic file, a version of an application identified by the type of the electronic file, and the electronic file conversion program product converting a description format of an electronic file to correspond to a new version of the application from the version of the application, with each other, and storing the associated type, the associated version, and the associated electronic file conversion program product in a memory;

detecting an electronic file to be converted, with the stored type of the electronic file, and the stored version of the application;

converting the description format of the detected electronic file while maintaining the type of the electronic file, with the electronic file conversion program product corresponding to the detected electronic file; and associating the electronic file in which the description format is converted, the type of the electronic file, and the new version of the application identified by the type of the electronic file, with each other, and storing the associated electronic file, the associated type, and the associate new version in the memory, wherein the description format comprises a type of the electronic file and a version of the type of the electronic file, the version representing a version of an application identified by an MIME type.

* * * * *